United States Patent [19]
Aviles et al.

[11] Patent Number: 4,601,637
[45] Date of Patent: Jul. 22, 1986

[54] MANIPULATOR GRIPPER TOOL CHANGING APPARATUS

[75] Inventors: Henry E. Aviles, Tucson, Ariz.; Jane A. Gregory, Boynton Beach, Fla.

[73] Assignee: International Business Machines Corporation, Armonk, N.Y.

[21] Appl. No.: 565,444

[22] Filed: Mar. 16, 1984

[51] Int. Cl.⁴ .............................................. B25B 1/24
[52] U.S. Cl. .................................... 414/739; 269/281; 901/39
[58] Field of Search ................ 414/739, 729; 901/39, 901/31, 36; 294/86.4, DIG. 2; 269/281, 280, 279

[56] References Cited

U.S. PATENT DOCUMENTS

| | | | |
|---|---|---|---|
| 3,565,417 | 2/1971 | Degle | 269/284 |
| 4,046,263 | 9/1977 | Cwycyshyn et al. | 901/30 X |
| 4,227,853 | 10/1980 | Woodford et al. | 414/738 |
| 4,448,405 | 5/1984 | Cipolla | 901/39 X |
| 4,488,241 | 12/1984 | Hurchins et al. | 901/30 |

OTHER PUBLICATIONS

IBM Technical Disclosure vol. 24, #6, 11/1981.

*Primary Examiner*—William E. Wayner
*Attorney, Agent, or Firm*—Harold H. Sweeney, Jr.

[57] ABSTRACT

A gripper pad or gripper tool changer for a multi-axis manipulator is provided which is capable of automatically attaching in locked position a selected pair of a plurality of gripper pads or tools to the fingers of a gripper. Each pair of gripper pads or tools are mounted in a holder mechanism which is attached to a surface within the work envelope of the manipulator. The pairs of gripper pads or tools are picked up from the holder and attached and locked to the gripper fingers by controlled movement of the manipulator. A pair of gripper pads or tools are returned to the holder by controlled maneuvering of the gripper into the holder such that unlocking means associated therewith provide unlocking of the gripper pads or tools from the gripper fingers so that the gripper pads or tools can be detached from the gripper fingers. Error detection of missing or displaced finger tools in a pickup operation is provided.

13 Claims, 10 Drawing Figures

MANIPULATOR GRIPPER TOOL CHANGING APPARATUS

FIELD OF THE INVENTION

The invention relates to a programmed multi-axis manipulator and more particularly to a gripper pad or gripper tool changing apparatus for automatically changing the gripper pad or tool on the facing surfaces of the gripper fingers of the manipulator.

BACKGROUND OF THE INVENTION

The gripper of a manipulator provides a general purpose handling facility for tasks such as lifting, transporting, orienting and holding work pieces or tools which in turn perform special operations on work pieces. Because of the variety of operations and variety of shapes of objects to be handled by the gripper of the manipulator, the gripper finger pads or tools are not always suitable for a particular component to be handled or operation to be performed. Accordingly, after a cycle of operation, when a different sized component or shaped component or tool is to be handled, the gripper pads or tools are changed manually. It should be appreciated that this requires a considerable time interruption of the operation of the manipulator and in some cases requires considerable down time of the manipulator to make the change. In order to prevent operation interruptions, the gripper pad or tool has been designed such that it is capable of handling different shaped components. Such an all-inclusive design results in poor quality holding and handling of parts and in some instances introduces errors or inaccuracies.

In view of today's high speed manipulators and minimal grasping forces to prevent crushing of fragile components carried thereby, and also in view of the heavy weight objects carried thereby, it is felt necessary, if for no other reason than safety, to provide a locking means for securing the finger tools fixedly in place on the manipulator gripper. Furthermore, means of monitoring the desired locked position of the finger tool on the gripper to provide an indication of when the pad or tool is missing or is not securely locked in place is needed.

DESCRIPTION OF THE PRIOR ART

It is known from the prior art that tools at the end of a manipulator arm can be changed and locked in position. For example, U.S. Pat. No. 4,046,263 issued Sept. 6, 1977, shows a tool changing apparatus for a manipulator in which welding guns and other tools can be automatically changed and locked into position. The arrangement sets forth a support assembly which is connected to the end of the manipulator arm and is adapted to selectively carry one of the work tools. Each work tool has an upstanding plate that has an aperture formed therein defined by a plurality of straight sides in converging planes. The support assembly includes a pyramid-like projection formed with a slot. The projection has a plurality of converging sides corresponding to the number of sides in the aperture and is adapted to mate therewith after which a linear actuator fixed to the mounting member serves to extend a wedge member into the slot for clamping the upstanding plate to the mounting member. As can be seen, this is a complicated means of accomplishing the attachment and requires a pneumatic means for performing the locking function. The arrangement is not applicable to changing the pads or tools on fingers of a gripper.

IBM Technical Disclosure Bulletin, Vol. 24, No. 6, November, 1981, discloses a tool changer for a robotic assembly in which the tool portion carries a central coupling shaft which has an intermediate reduced diameter detent portion. This shaft is received in a robot portion opening which contains an annular piston and a pair of retention balls. When the coupling shaft is inserted in the opening a sufficient distance to permit the balls to be received in the detent groove, pneumatic pressure introduced through a passage drives the piston downward, causing the frustoconical surface to force the balls into the recess. Again, this is a complicated arrangement which requires a pneumatically operated piston to give the required coupling and is not applicable to the changing of pads or tools on fingers of a gripper.

U.S. patent application Ser. No. 471,569 filed Mar. 2, 1983, and assigned to the same assignee as this application, discloses an interchangeable pad on a gripper of a manipulator wherein the gripper pad or tool is slid onto a base plate held by the gripper surface. The pad or tool is held in position on the gripper finger by a spring loaded detent ball cooperating with a groove in the pad or tool. The gripper force applied to the object is also relied on to hold the pad or tool in place on the base plate. To change the tool axial pressure is applied thereto pulling it off the base plate or rail. This arrangement is relatively uncomplicated but lacks the required locking and unlocking means of the present invention to provide the locking of the gripper pad or tool onto the gripper.

As can be seen, the prior art provides for complicated locking arrangements for securely locking tools to the end of the manipulator arm or it provides interchangeable finger tools which do not have secure locking means and rely on frictional holding in place of the gripper pads or tools.

SUMMARY OF THE INVENTION

Briefly, the invention consists of a gripper pad or gripper tool changing apparatus wherein the pad or tool is slid onto a dovetail shaped rail carried by the facing gripper finger surfaces via a complementary dovetail shaped opening on the pad or tool itself under control of the manipulator controller. A locking means is provided consisting of spring tabs having a locking member on the outer ends thereof which fit into a groove in the gripper pad or tool to securely lock it in place on the gripper finger. A pad or tool holder is attached to a surface in the working area of the manipulator and includes at least one station having two pairs of blades. Each pair of blades are located on opposite sides of a wall of the holder and are positioned and shaped so as to provide unlocking of the locking means when the gripper is programmed for this function. Once unlocking takes place the gripper pads or tools can be removed from the gripper fingers and a new set of pads or tools picked up or some other cycle of operation can take place.

The invention further includes a series of holes in the holder wall at each station which in conjunction with a light beam which extends between the fingers in the gripper through holes in the rail and finger pad or tool of each cooperating finger provides a means of detecting errors such as missing pads or incorrectly attached pads.

Thus, there is provided a gripper pad or tool changing apparatus in which pairs of selected gripper pads or tools can be picked up in locked position on opposing gripper fingers or deposited and unlocked at a holder which provides error detection capability.

It should be appreciated that the mounting of the gripper pad or tool on the rail and the locking means is sufficient to provide no motion of the gripper pad or tool with respect to the finger surface; therefore, the finger pressure sensing means located in each finger of the gripper is operable with respect to the locked pad or tool similar to the operation with respect to the gripper finger surface itself.

Other objects, features and advantages of the invention will be apparent to those skilled in the art from the following description of a preferred embodiment of the invention, wherein reference is made to the accompanying drawings, of which:

Figure 1:
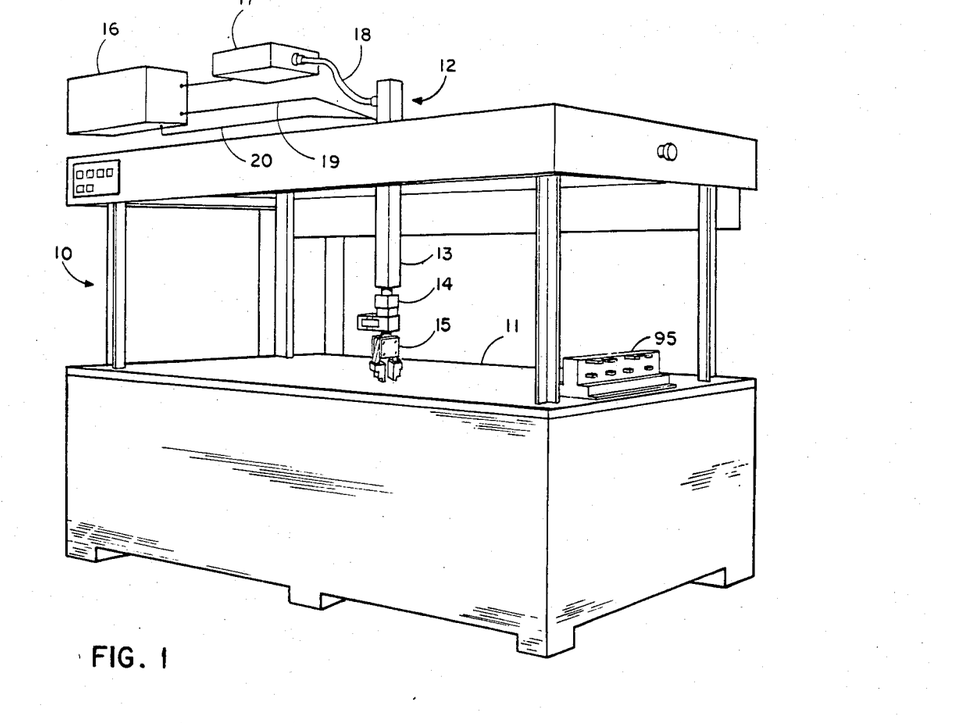
FIG. 1 is a perspective view of a manipulator, including a gripper and a tool holding member located on a surface within the work envelope of the manipulator.

Referring to FIG. 1, there is shown a schematic diagram of a robot or object manipulator 10 of the so-called box frame type which is marketed by International Business Machines Corporation under the name of 7565 Manufacturing System. Except for the gripper details as hereinafter described, the remainder of the robot, including its control system, is otherwise known to those skilled in the art. The automatic interchangeable gripper finger pads or tools of this invention are not limited to this manipulator, but are adaptable to most robots having a gripper of the type having facing fingers for grasping objects.

The manipulator 10 comprises a table 11 having an overhead carriage assembly 12 which supports an arm 13 for X, Y and Z movements throughout the work space over table 11.

The arm 13 carries at the lower end thereof a wrist mechanism 14 to which is attached a gripper 15 by means of which various objects and tools can be grasped and manipulated. The three degrees of freedom of the arm 13 and the various degrees of freedom of the wrist mechanism 14 enable the gripper 15 to be moved and oriented as required by the control means, to perform a variety of tasks.

The gripper 15 is controlled by a computer 16 which controls a hydraulic power source 17 connected through hydraulic line 18 to the various operating units on the arm 13. Electrical power for operating various switches and sensors is delivered through electrical line 19 from the control computer 16. Feedback from various sensors within the gripper 15, and elsewhere in the manipulator 10, is delivered to the computer 16 through cable 20.

Figure 2:
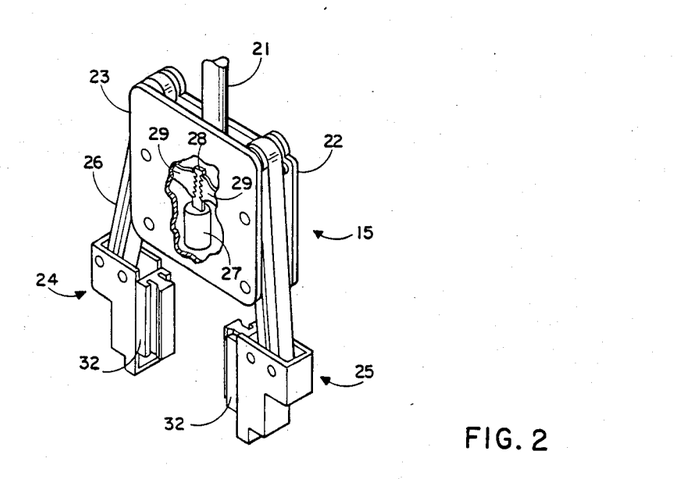
FIG. 2 is an enlarged schematic view of a gripper of the type used in the manipulator of FIG. 1 which includes the rails and locking member for receiving and locking gripper pads or tools thereon.

FIG. 2 shows the details of the gripper 15. The gripper 15 is supported by shaft 21 from the wrist mechanism 14 of FIG. 1 and includes a frame structure provided by plates 22 and 23 and a pair of opposed fingers 24 and 25, each of which is suspended from the frame by a pair of articulated parallel links 26. The links 26 are mounted in such a way as to enable the fingers 24 and 25 to remain parallel while moving relative to one another.

Links 26 are operated or controlled by a hydraulic motor 27, mounted within the frame, which displaces a rack 28 to drive a pair of sector gears 29 connected to the links 26. Hydraulic motor 27, of course, is controlled by computer 16 through hydraulic power source 17. The fingers 24 and 25 thus are operable to grasp objects by controlled mutual force developed therebetween.

Figure 3:
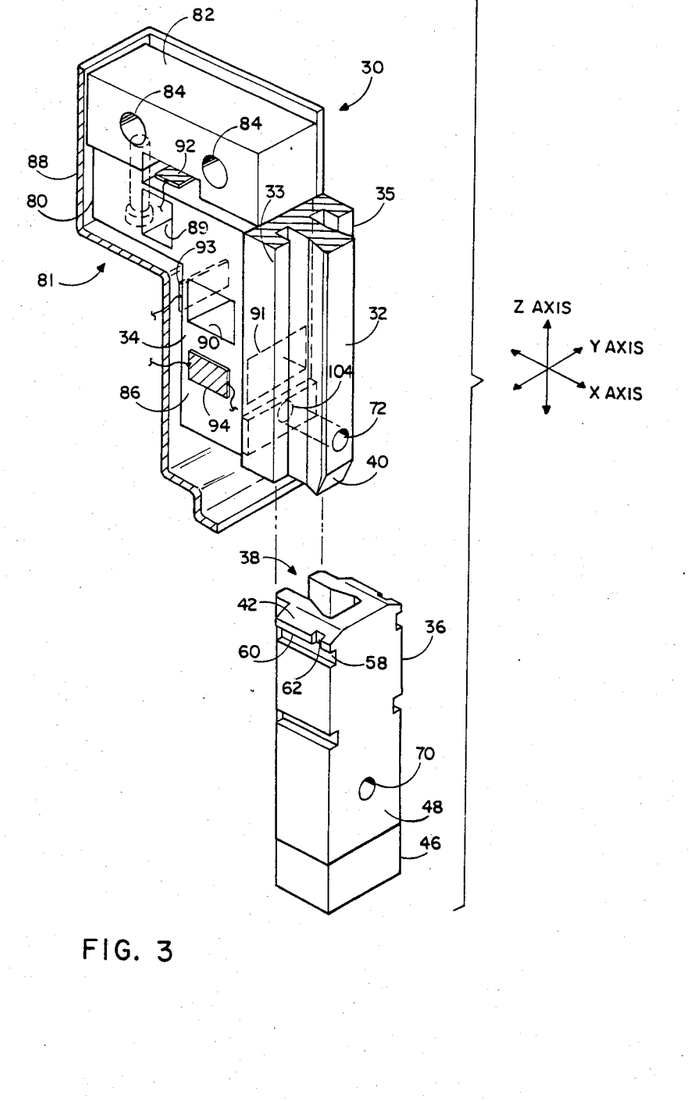
FIG. 3 is a schematic exploded view of one finger of the gripper as shown in FIG. 2, together with a gripper pad constructed in accordance with our invention.

The fingers 24 and 25 each have a dovetail shaped rail 32 attached to or forming part of the facing surfaces of the fingers, as shown in FIG. 3.

The new configuration of the finger 30 is shown in FIG. 3 and includes a dovetail shaped rail 32 which runs lengthwise along the facing surfaces of the fingers. The dovetail shaped rail is secured to the flexure member 34 by key means and by a shoulder bolt (neither of which is shown). The finger pad or tool 36 is shown schematically with the complementary shaped dovetail opening 38 in position to receive therein the rail 32. As can be seen in FIG. 3, the surfaces of the dovetail shaped rail and the complementary opening for receiving said rail have the edges thereof chamfered for ease of insertion of the rail into the opening, for example, the leading edge 40 of the rail and the side edges 42 of the finger pad or tool 36. The rail 32 is made sufficiently thick that it provides a good strong support in directions at right angles to the rail length. The side pieces 33 and 35 attached to or forming part of the rail 32 run parallel to the rail along either side thereof and provide further support to hold the gripper finger tool tightly on the rail.

Figure 4A:
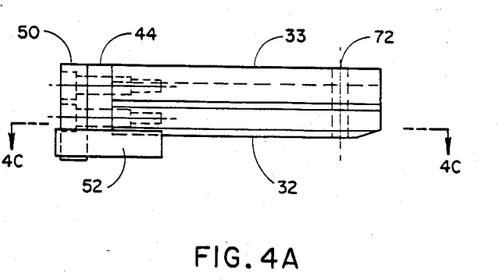
FIGS. 4A, B and C are schematic side, end and view along line A—A diagrams respectively showing the details of the locking mechanism mounted on the gripper finger of the gripper.
Figure 4B:
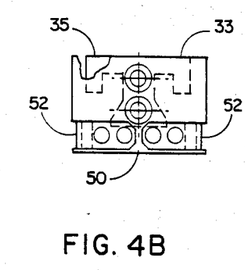
Figure 4C:
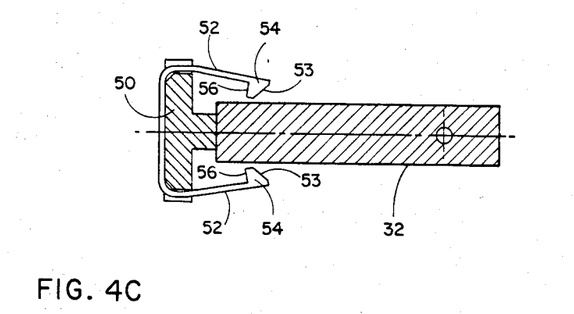
Figure 5A:
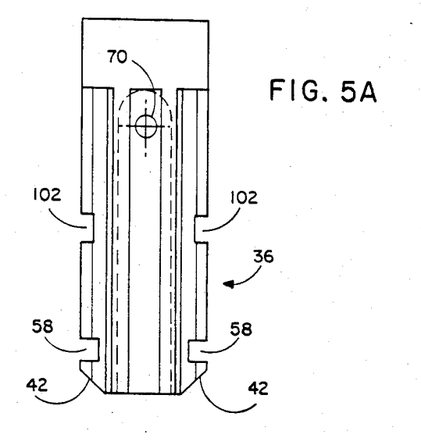
FIGS. 5A, 5B and 5C are schematic diagrams showing the side, end and plan view details of the finger tool.
Figure 5B:
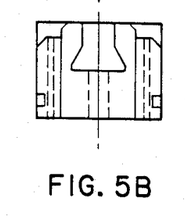
Figure 5C:
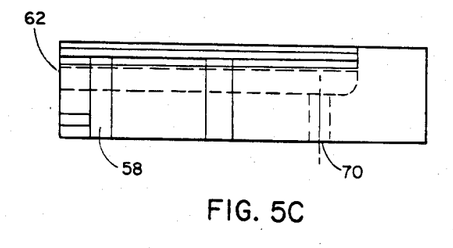

Referring to FIG. 4, the dovetail shaped rail 32 has a top plate 44 which serves as a stop when the finger tool 36 is fully inserted on rail 32. Similarly the finger pad or tool 36 has a bottom block 46, the top surface 48 of which can serve as a stop for the Z direction motion of the rail 32 when inserted fully therein in the Z direction.

The locking mechanism is shown in detail in FIG. 4 and has not been included in FIG. 3 since it obscures the rail shape which we wished to illustrate. The locking mechanism consists of a locking tab plate 50 which is attached to the top end of the dovetail shaped rail member 32. Locking tabs 52 are best illustrated in FIG. 4C and are shown attached to the locking tab plate 50 in FIG. 4B. The locking tabs 52 are made of a spring metal and, in the case shown are biased toward each other, one from either side of the rail member 32. Thus, as the dovetail shaped rail member 32 is inserted in the Z axis direction into complementary dovetail shaped opening 38, the spring metal tabs 52 are spread apart by the chamfered leading edges 42 of the finger pad or tool 36 near the end of the fully inserted movement. The locking portion 54 of the locking tab 52 consists of an inwardly extending flat surface 56 which locks into a groove or slot 58 which extends at right angles to the Z axis across both sides of the finger pad 36. The slot 58 is a small distance from the leading chamfered edge 42 of the finger pad member 36 so that the locking tab 52 can securely lock into the slot 58 via the cooperation of surface 56 of the locking tab 52 and the top surface of the slot 58. A groove 62 extends vertically from the chamfered edge 42 to the slot 58 on both sides of the gripper finger tool 36 to guide the locking portion 54 of the locking tab 52 into locking position during insertion of the finger tool 36 on the rail 32 of the gripper finger 30. The locking portion 54 is chamfered along the inward bottom edge thereof for ease of outward displacement during insertion of the rail 32 into the finger tool 36. The gripper finger tools 36 are held in the holder 95 by holding extensions 97 which are arranged in pairs extending from opposite sides of the rack wall 98. These holding extensions 97 have a chamfered outer edge of the facing surfaces thereof to guide the finger tools 36 into the held position in the holder 95. The holding extensions enter slots 102 in the finger tool 36 to provide alignment as well as holding of the finger tool 36 in the holder 95. Thus, when the finger tool 36 is unlocked from the rail 32, the holding extensions hold the finger tool 36 in place as the manipulator raises the gripper in the Z direction so that the rails 32 are pulled from the finger tool 36.

Figure 6:
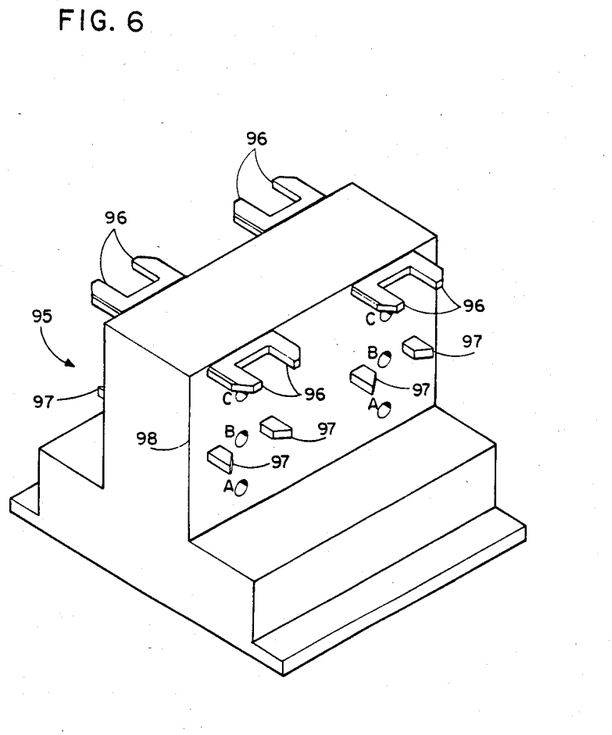
FIG. 6 is a schematic diagram of a gripper pad or tool holder illustrating the unlocking means for automatic removal and inserting of other gripping pads or tools and the error detection means.

The positions established on opposite sides of the rack wall 98 are considered a station. Accordingly, there are a plurality of stations in the holder 95.

The unlocking operation consists of moving the robot to a point above the tool holder or rack 95. Then the program via the computer 16 controls the gripper 15 to open the fingers 24 and 25 to their widest position or to an open position wider than the rack portion of the tool holder 95. Once the fingers are lowered into position, one finger on either side of the rack 95, the program calls for a closing action which brings the gripper fingers toward one another. In this operation the pair of blades 96 extending from opposite sides of the tool holder 95 fit inside of the locking tabs 52. As can be seen in FIG. 6, the ends of the blades are chamfered on the outer outside edge to better fit between the locking tabs 52 and the locked on finger tool 36. The thicker portion of the blades 96 spread the locking tabs further so that they are held out beyond the locking groove 58 in the finger tool 36 so that an upward movement of the manipulator carrying the gripper fingers in the Z axis direction will remove the rail 32 from the finger pad 36 of the rail 32 into the finger tool 36.

When it is desired to pick up new finger tools 36 for the fingers, the manipulator is controlled to bring the gripper 15 to a point above the holder 95 at which point the fingers are opened the desired amount. The manipulator and the fingers 24 and 25 carried thereby are moved downward in the Z axis direction so that the rail member 32 enters the complementary opening in the finger tool when the rail member 32 is fully inserted into the finger tool 36, that is, the top of the finger tool 36 is against the bottom surface of the top plate 44 of the rail member 32 and the bottom of the rail member is stopped against the top surface 48 of the bottom block 46 of the finger tool 36. The bottom surface 53 of the locking portion 54 of the locking tab 52 is chamfered so that it rides over the blades and is held in a spread condition. As the gripper 15 is opened via the controller, the locking portions 54 drop into position in the locking grooves or slots 58 to provide the locking. This locking happens before the finger tool 36 leaves the holder extensions 97 on which it is resting so that there is no tendency for the finger tool to drop out of its desired position before the locking takes place. The finger opening action stops at the programmed point from which the manipulator moves the gripper vertically to clear the holder so that it is free to proceed with its operations.

The finger pads or finger tools 36 not only have various surface configurations for handling different size and shaped components but can have the surface configured to securely grasp a tool, such as a drill, etc.

Thus, there is provided an automatic finger tool changing capability utilizing a programmed manipulator to facilitate the locking and unlocking of the finger tools with respect to fingers of the gripper.

Since the finger tool is securely locked to the finger member 30, heavy loads can be lifted by the gripper and the possibility of the finger tools 36 slipping in the Z axis direction are, for all practical purposes, eliminated. Therefore, any pull downward in the Z axis direction will not pull the finger tool 36 from the rail member 32.

The finger 30 includes a force sensing means which comprises an L-shaped member having a horizontal leg 80 that is attached to a bearing block 82 to which the parallel links 26 pivotally attach through pivot bores 84. The downwardly extending leg 86 of the L-shaped member has the dovetail shaped rail member 32 mounted thereon. A casing or shroud 88 covers finger 30. This shroud has been broken away to show the inclusion of cut-out portions 89, 90 and 91 which provide thin, more flexible sections of the L-shaped member 81, on which are mounted strain response elements 92, 93 and 94, respectively. These strain response members are gauges deformed in response to multi-axial forces applied to the dovetail shaped rail member 32 to sense the interaction of the member with other objects and develop feedback signals to be sent back on cable 20 to computer 16.

A further sensing means is provided in the gripper 15 which consists of a light source 104 located in the facing surface of one of the fingers 24 or 25 and a light receiver at the same location in the other finger. The rail 32 is provided with an opening 72 and the finger tool 36 is also provided with an opening 70 which openings align with one another and the light source and receiver to give a continuous straight light path indicating alignment of the rail member 32 and the finger tool 36 when the finger tool is correctly mounted on the rail member.

Error detection means is included in the automatic gripper finger tool changing apparatus utilizing the force sensing and light beam sensing arrangement already existing in the manipulator. Holes A, B and C are located in the holder 95 at each station. The holes extend straight through the wall 98 at each station and are utilized to complete the light path from the light source 104 during a cycle of operation for finger tool pick-up and drop-off. The holes in the holder 95 are designated C, B and A from top to bottom of the holder wall 98. For example, if two finger pads were present in a station in the holder 95 and are to be picked-up, the gripper opening would be preset so that the gripper would move down and the doveshaped rails 32 would be guided into the corresponding doveshaped openings in the corresponding finger tools. As the rails are inserted the light sensor would detect the sensor beam at opening A when the rails bottomed out in the pad representing a correctly placed finger tool on the finger of the gripper. The gripper would then squeeze the holder 95 by controlling the fingers to apply force toward one another and utilize the reaction in the force sensor to detect that both pads are present.

To pick up the finger pads 36 that have been attached to the gripper fingers from the holder 95, the gripper is opened to its widest dimension in order to clear the holder extensions 97, and then moved vertically. The holes B and C would complete the light path indicating both finger tools 36 have been successfully picked-up.

The possible pad pick-up error situations detectable by the manipulator sensors are shown in the table below.

|  | Successful Pick-up | Hole Sensing Per Cycle | Force Sensor Used Yes/No |
| --- | --- | --- | --- |
| Both Pads Present in the Station | Y | 1 Down 2 Up A, B, C | Yes |
| Both Pads Missing from the Station | N | CBABC | No |
| One Pad Missing in the Station | N | ABC | Yes |
| One Pad Left in the Station | N | A | No |
| Both Pads Left In the Station | N | A | No |

It should be appreciated that the automatic gripper finger tool changing apparatus of this invention has the ability to use the existing sensors and gripper functions to lock and unlock, pick-up and drop-off finger pads or finger tools and detect error conditions.

While there has been described what is at present considered to be a preferred embodiment of this invention, it will be obvious to those skilled in the art that various changes and modifications may be made therein without departing from the invention.

What is claimed is:

1. Automatic gripper finger tool changing apparatus for a multi-axis manipulator of the type having control means for effecting the change of the gripper finger tool on facing surfaces of the gripper comprising:
    a dovetail shaped rail attached to and located lengthwise along said facing surfaces of the gripper;
    each of said gripper finger tools having a complementary dovetail shaped opening formed lengthwise therein, said opening being of a size to prevent said dovetail shaped rail from moving in any direction except lengthwise when inserted therein;
    said control means associated with said manipulator providing movement of said gripper to cause said dovetail shaped rail to slide lengthwise into said dovetail shaped opening;
    locking means for locking said dovetail shaped rail in said dovetail shaped opening in said gripper finger tool;
    a tool holder located in the work space of said manipulator for holding said gripper finger tools when not attached to said gripper fingers and where said finger tools are picked up and deposited under control of said control means;
    unlocking means located on said tool holder for automatically unlocking said dovetail shaped rail from said finger tool so that said manipulator can remove said dovetail shaped rail from said dovetail shaped opening.

2. Automatic gripper finger tool changing apparatus according to claim 1, wherein said unlocking means on said tool holder includes at least a pair of blades spaced from one another so as to unlock said locking means holding said gripper finger tool on said gripper finger when said control means positions the gripper with respect to said blades and closes said fingers on said blades thereby effecting the unlocking.

3. Automatic tool changing apparatus according to claim 2, wherein said pair of blades are chamfered at the outside edge of the outer end thereof to fit between said locking means and said gripper finger tool.

4. Automatic gripper finger tool changing apparatus according to claim 1, wherein said locking means includes a pair of locking spring tabs each having an inwardly facing locking member with a flat surface facing the top of the spring tab at the bottom end thereof, and a groove at right angles to the longitudinal dimension of said finger and adjacent the end of said gripper finger tool having said opening therein into which said locking member of said spring tab fits when said gripper finger tool is in place on said gripper finger.

5. Automatic gripper finger tool changing apparatus according to claim 4, wherein a pair of grooves extend lengthwise, one on each side of said gripper finger tool, opposite one another providing a channel in which said locking member travels lengthwise along said gripper finger tool until it latches into said groove.

6. Automatic gripper finger tool changing apparatus according to claim 1, wherein said control means provides at least movement of said gripper carried by the end of the manipulator along two axis mutually perpendicular to one another to move said gripper in the one axis direction so as to cause said dovetail shaped rail of said gripper finger to slide into said dovetail shaped opening in said gripper finger tool until said rail is inserted far enough to have said locking means lock said gripper finger tool in place and to move said gripper in the other perpendicular axis direction to remove said gripper finger tool from said holder thereby actuating said locking means.

7. Automatic gripper finger tool changing apparatus according to claim 1, wherein said control means effects movement of said gripper so that each finger of said gripper is on opposite sides of said holder so that closing of said gripper fingers towards one another effects the unlocking of said locking means on each of said fingers simultaneously.

8. Automatic gripper finger tool changing apparatus according to claim 1, wherein said tool holder includes a wall, a plurality of stations for pick-up and drop-off of a pair of gripper finger tools, each station extending from opposite sides of said wall.

9. Automatic gripper finger tool changing apparatus according to claim 8, wherein each of said stations on said tool holder includes two pairs of retention guides, one pair on opposite sides of said wall for guiding and holding both of said gripper finger tools of said gripper simultaneously.

10. Automatic gripper finger tool changing apparatus according to claim 9, wherein said pairs of retention guides have the facing outer edges chamfered to provide improved positioning tolerance.

11. Automatic gripper finger tool changing apparatus according to claim 8, wherein each station has at least three holes passing straight through and perpendicular to opposite sides of said wall and spaced from each other along a straight line running down the middle of said station lengthwise thereof.

12. Automatic gripper finger tool changing apparatus according to claim 11, further comprising detecting means including a light beam directed from one finger to the other perpendicular to said facing surfaces;

said dovetail shaped rail and each of said gripper finger tools having an opening therethrough at the same location as said light beam to allow passage of said light beam therethrough when said gripper finger tools are located in locked position on said dovetail shaped rails;

said at least three holes passing through said holder wall each providing a completed path for said light beam when the hole in said dovetail shaped rail and the hole in said gripper finger tool align therewith to provide a means of detecting the order in which said at least three holes were sensed.

13. Automatic gripper finger tool changing apparatus according to claim 12, further comprising force sensing means on each of said gripper fingers, said control means providing control for energizing said force sensing means in conjunction with said detecting means to determine the presence of both gripper finger tools in said holder and one gripper finger tool missing from said holder.

* * * * *